US012783690B2

(12) United States Patent
Chung

(10) Patent No.: US 12,783,690 B2
(45) Date of Patent: Nov. 3, 2026

(54) BACKUP-BASED RANSOMWARE ATTACK SIMULATION METHOD AND SIMULATION DEVICE

(71) Applicant: DELTA ELECTRONICS, INC., Taoyuan City (TW)

(72) Inventor: Shen-Ming Chung, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 52 days.

(21) Appl. No.: 19/083,687

(22) Filed: Mar. 19, 2025

(65) Prior Publication Data

US 2025/0298904 A1 Sep. 25, 2025

Related U.S. Application Data

(60) Provisional application No. 63/567,072, filed on Mar. 19, 2024.

(30) Foreign Application Priority Data

Feb. 12, 2025 (TW) ................................ 114105182

(51) Int. Cl.
*G06F 21/57* (2013.01)
*G06F 11/1446* (2026.01)

(52) U.S. Cl.
CPC ........ *G06F 21/577* (2013.01); *G06F 11/1469* (2013.01); *G06F 2201/84* (2013.01); *G06F 2221/034* (2013.01)

(58) Field of Classification Search
CPC ....... G06F 21/57; G06F 11/14; G06F 2201/84
See application file for complete search history.

(56) References Cited

U.S. PATENT DOCUMENTS

| | | | | |
|---|---|---|---|---|
| 11,144,638 | B1 * | 10/2021 | Golden | G06F 21/554 |
| 11,729,203 | B2 * | 8/2023 | Kras | H04L 63/20 726/26 |
| 12,436,849 | B2 * | 10/2025 | Thomas | G06F 11/0712 |
| 12,574,401 | B2 * | 3/2026 | Bachar | H04L 63/1433 |
| 12,652,292 | B2 * | 6/2026 | Bachar | H04L 63/1416 |
| 2020/0177612 | A1 * | 6/2020 | Kras | G06N 20/00 |
| 2021/0312066 | A1 * | 10/2021 | Hansen | G06F 11/1451 |
| 2021/0357504 | A1 * | 11/2021 | Saad | G06F 21/567 |
| 2023/0362194 | A1 * | 11/2023 | Lai | H04L 63/1491 |
| 2024/0045990 | A1 * | 2/2024 | Boyer | G06F 21/6245 |

(Continued)

FOREIGN PATENT DOCUMENTS

CN 111756687 A 10/2020

*Primary Examiner* — Viral S Lakhia

(74) *Attorney, Agent, or Firm* — HDLS IPR SERVICES; Chun-Ming Shih

(57) ABSTRACT

A backup-based ransomware attack simulation method is disclosed and includes: generating a first file in a simulation device; when a first scheduled time is reached, automatically backing up for the first file to generate a first backup file; corrupting the content of the first file to generate a second file, wherein the second file is regarded as a file being attacked due to the corrupted content; when a second scheduled time is reached, automatically backing up the second file to generate a second backup file; sending an alert message as a result of the corrupted content of the second file; and, providing a restoring measure for the user of the computer to restore the content from the first backup file.

20 Claims, 7 Drawing Sheets

(56) References Cited

U.S. PATENT DOCUMENTS

| | | | | |
|---|---|---|---|---|
| 2024/0111861 | A1* | 4/2024 | Yadav | G06F 21/554 |
| 2024/0248803 | A1* | 7/2024 | Rothschild | G06F 11/1451 |
| 2024/0370567 | A1* | 11/2024 | Rafikov | G06F 21/577 |
| 2025/0069017 | A1* | 2/2025 | Sethi | G06F 21/552 |

* cited by examiner

BACKUP-BASED RANSOMWARE ATTACK SIMULATION METHOD AND SIMULATION DEVICE

CROSS-REFERENCE TO RELATED APPLICATION

This patent application claims the benefit of U.S. Provisional Patent Application No. 63/567,072, filed Mar. 19, 2024, which is incorporated by reference herein.

BACKGROUND OF THE DISCLOSURE

Technical Field

The disclosure relates to a simulation method and a simulation device, and particularly to a simulation method and a simulation device for simulating a computer suffering from ransomware attacks.

Description of Related Art

Due to the widespread use of the Internet and the increasing awareness of network security among users, numerous backup systems currently exist in the market that can assist users in backing up data on their computers. Additionally, there are some services that can simulate ransomware attacks to assess the defense capabilities of enterprises.

However, the market currently lacks ransomware attack simulation software that integrates a backup mechanism and can simulate ransomware attacks for users during scheduled backup activities. Such software should enable users to familiarize themselves with the restoring process in the event of an attack, and allow them to experience the protective capabilities afforded by regular backups. Therefore, in addition to enhancing user awareness and response capabilities regarding ransomware, such software can educate users to develop the habit of regular backups, thereby reducing the potential damage from actual ransomware attacks.

SUMMARY OF THE INVENTION

The present disclosure discloses a backup-based ransomware attack simulation method and simulation device, which may simulate ransomware attacks during regular scheduled backup processes, thereby leading the users to become familiar with themselves with the correct response in the event of ransomware attacks, especially how to accurately execute restoring processes after ransomware attacks.

In one of the exemplary embodiments, the backup-based ransomware attack simulation method of the present disclosed is applied to a simulation device, the simulation device has an agent software utilized for backup, and the simulation method includes following steps:

automatically generating a first file and storing the first file to a backup folder associated with a backup plan by the agent software;

backing up the first file in the backup folder to generate a first backup file by the agent software when a first scheduled time indicated by the backup plan is reached;

corrupting the content of the first file to generate a second file by the agent software, wherein the second file is regarded as a result of a ransomware attack due to a corrupted content of the second file;

backing up the second file in the backup folder to generate a second backup file by the agent software when a second scheduled time indicated by the backup plan is reached;

sending an alert message by the agent software based on the corrupted content of the second file; and providing a restoring measure by the agent software, and restoring the content of the first backup file by the agent software when the restoring measure is triggered.

In one of the exemplary embodiments, the backup-based ransomware attack simulation device of the present disclosure includes one or more processors, the one or more processor is configured to execute an agent software that records a plurality of computer executable instructions to execute following actions:

automatically generating a first file and storing the first file to a backup folder associated with a backup plan;

backing up the first file in the backup folder to generate a first backup file when a first scheduled time indicated by the backup plan is reached;

corrupting the content of the first file to generate a second file, wherein the second file is regarded as a result of a ransomware attack due to a corrupted content of the second file;

backing up the second file in the backup folder to generate a second backup file when a second scheduled time indicated by the backup plan is reached;

sending an alert message based on the corrupted content of the second file; and providing a restoring measure, and restoring the content of the first backup file when the restoring measure is triggered.

Compared with the related art, the present disclosure simulates ransomware attacks to corrupt file content to increase the user awareness of data backup, and confirms whether the users have become proficient in the restoring process. Therefore, it may evaluate the response capabilities of a user regarding the ransomware attacks, and educate the user on the ability to execute the restoring process.

DETAILED DESCRIPTION

The present disclosure relates to a backup-based ransomware attack simulation method (referred to as the simulation method hereinafter). The simulation method is applied to computers of a company, an enterprise, or a factory. The simulation method uses software installed on the computers to regularly back up data stored in the computers for users, intentionally corrupt the content of a specific file in the computers to simulate a ransomware attack without impacting users' operation and computer security, and subsequently provide a restoring measure for the specific file that has been corrupted. Therefore, the present disclosure may increase users' awareness of regular backup, evaluate the user's response capabilities in the event of ransomware attacks, and enable the user to become proficient in the restoring process by triggering simulation attacks.

Figure 1:
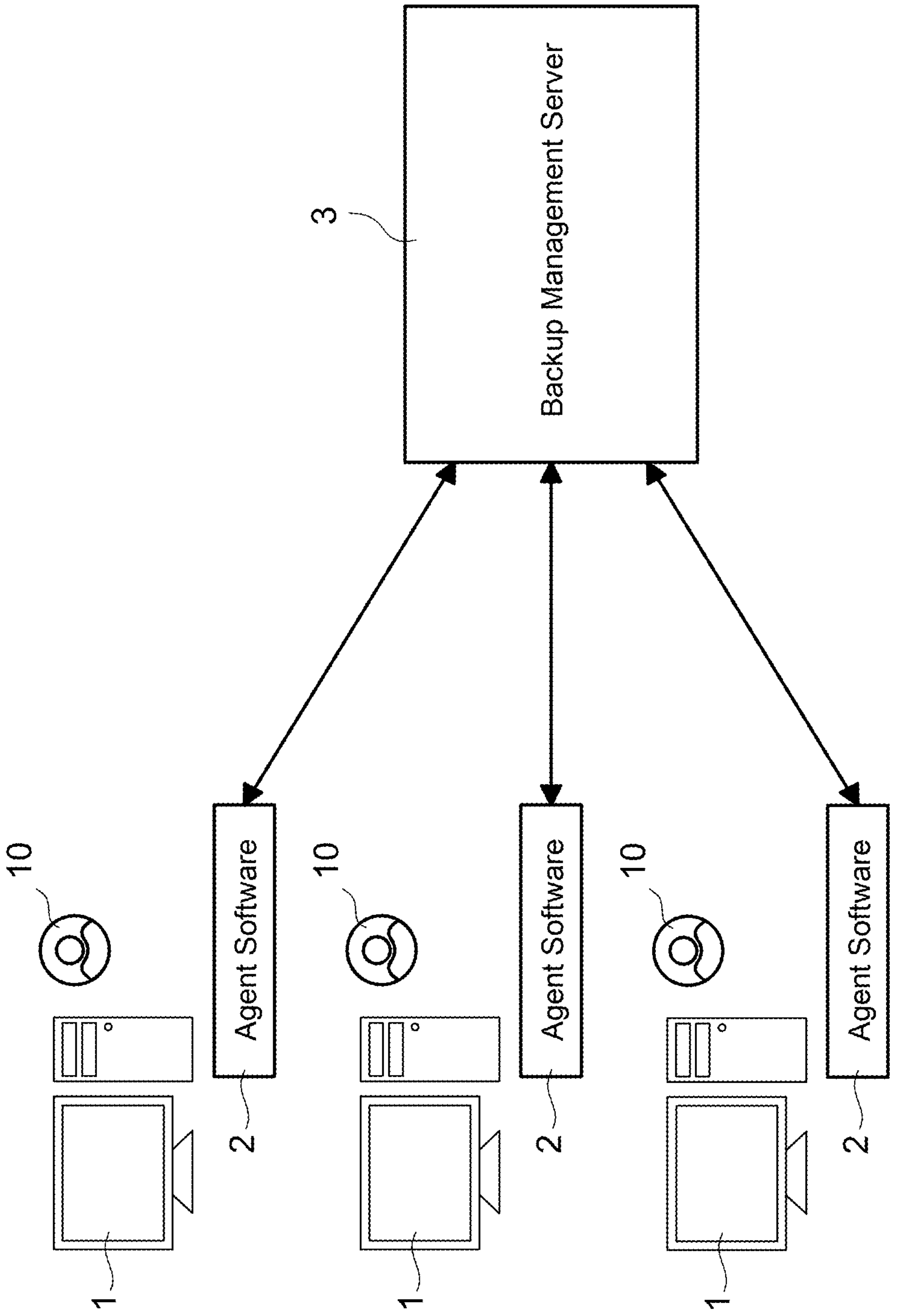
FIG. 1 is a schematic diagram showing the devices connection of an embodiment according to the present disclosure.

Please refer to FIG. 1, which illustrates a schematic diagram showing the device connections of an embodiment according to the present disclosure. As shown in FIG. 1, the simulation method of the present disclosure is applied to an environment of a company, an enterprise, or a factory that includes multiple computers. Taking a company as an example, the company owns a plurality of computers, with each computer used by a corresponding user 10. In the present disclosure, each computer is individually installed with an agent software 2 (also called a backup agent), and the agent software 2 is configured to regularly back up data for the computer. In one embodiment, multiple instances of agent software 2 installed on multiple computers of same company, department, or unit can be configured differently, thereby backing up different files or folders at different time points and storing backup files to different backup destinations. However, the above description is only one exemplary embodiment of the present disclosure and is not intended to be limiting.

The simulation method of the present disclosure is applicable to computers on which the agent software 2 is installed. For ease of interpretation, the description below regards every computer that has been installed with the agent software 2 as a backup-based ransomware attack simulation device of the present disclosure (hereinafter referred to as the simulation device 1).

As shown in FIG. 1, the simulation device 1 is connected to a backup management server 3 through the agent software 2. In one embodiment, the backup management server 3 is used to configure and manage one or more backup plans for the agent software 2. The backup plans may include, but not limited to, a backup time, a backup cycle, and a backup folder. In one embodiment, the backup management server 3 may also serve as a backup destination for the agent software 2. Furthermore, in one embodiment, the backup management server 3 may analyze backup data received from the agent software 2 and determines whether the simulation device 1 is experiencing a ransomware attack based on the analyzed result. Alternatively, in another embodiment, the agent software 2 itself may perform such analysis and determine whether the simulation device 1 is under a ransomware attack based on the analyzed result. The ransomware attack referenced herein may refer to either a real ransomware attack or a simulation attack initiated by the agent software 2. In one embodiment, the backup management server 3 sends an alert message to the simulation device 1 when determining that a file in the simulation device 1 is corrupted in order to notify the user to initiate a restoring process.

One technical feature of the present disclosure is that the agent software 2 may create a new file in the simulation device 1 without impacting user operation or compromising the security of the simulation device 1. The agent software 2 first backs up the new file, then corrupts the new file, and then treats the corrupted new file as a result of a simulated ransomware attack. Next, the agent software 2 guides the user 10 to perform a restoring process. By using the simulation process described above, the present disclosure may increase user awareness of the backup process and evaluate the user 10's response capabilities during a ransomware attack.

Figure 2:
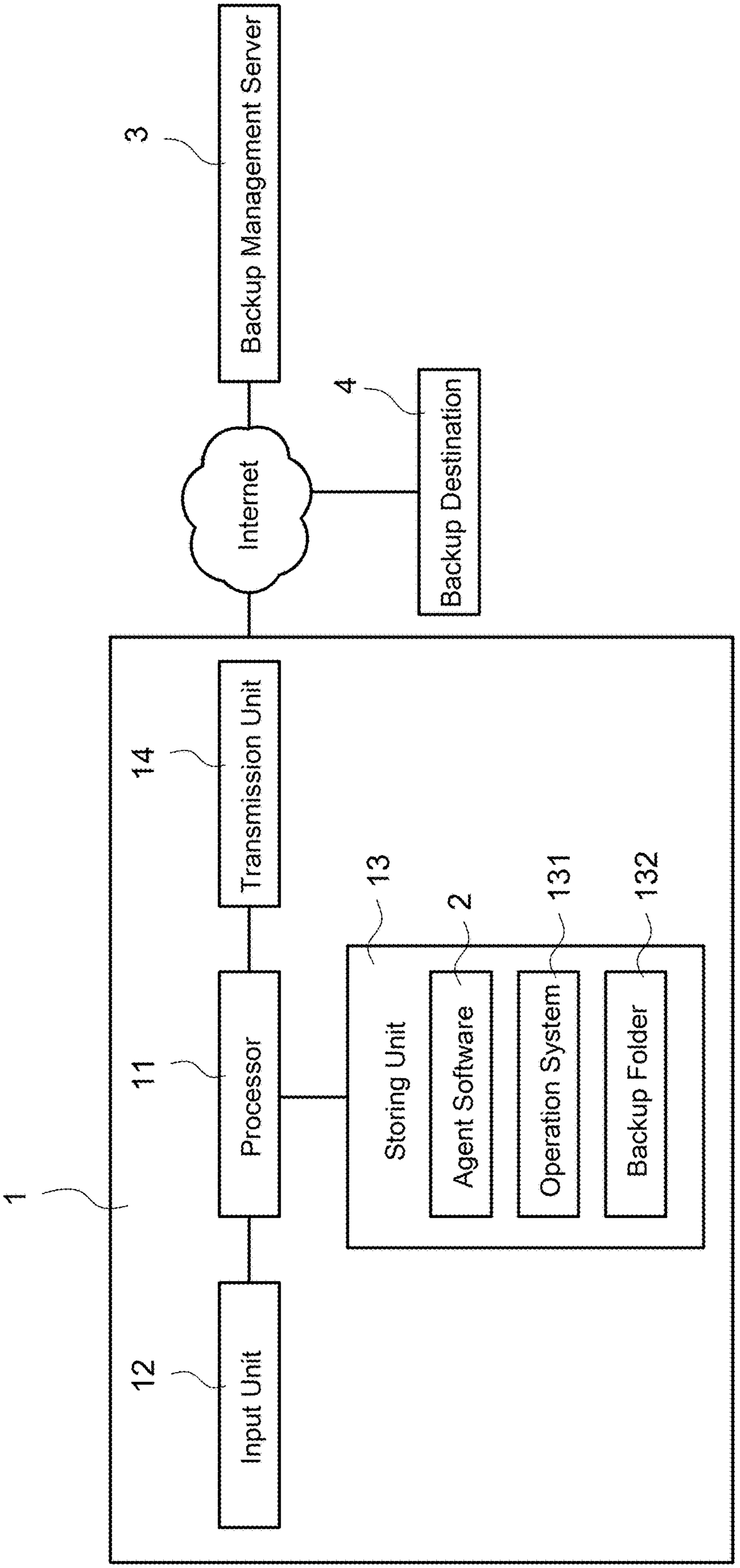
FIG. 2 is a black diagram of the simulation device of an embodiment according to the present disclosure.

Please refer to FIG. 2, which is a block diagram of the simulation device of an embodiment according to the present disclosure. As described above, the simulation device 1 of the present disclosure refers to any computer with the agent software 2. As shown in FIG. 2, the simulation device 1 includes one or more processors 11 (only one is exemplified in FIG. 2 but not limited thereto), an input unit 12, a storing unit 13, and a transmission unit 14, wherein the one or more processors 11 are electrically connected to the input unit 12, the storing unit 13, and the transmission unit 14.

In one embodiment, the one or more processors 11 may be central processing units (CPU), micro control units (MCU), programmable logic controllers (PLC), system on chips (SoC), or field programmable gate arrays (FPGAs), etc. The one or more processors 11 are utilized to execute the agent software 2. The agent software 2 records multiple computer executable instructions. When the one or more processors 11 of the simulation device 1 execute the multiple computer executable instructions of the agent software 2, each step and function of the simulation method of the present disclosure can be implemented (detailed as described in the following).

The input unit 12 may be, for example but not limited to, a keyboard, a mouse, a touch pad, or a touch screen, etc. The user 10 operates the simulation device 1 through the input unit 12 to, for example, configure the backup plans and trigger the simulation device 1 to perform the restoring process, etc. The storing unit 13 may be, for example but not limited to, a hard disk drive (HDD), a solid-state drive (SSD), a flash drive, a cloud storage, a CD ROM, or other storing component with storing capabilities. The storing unit 13 is utilized to store an operating system 131 of the simulation device 1 and the agent software 2. It should be mentioned that, upon configuring the backup plan, the user 10 can select one or more desired backup folders 132 which need regular backup. In other words, once a designated time configured in the backup plan is reached, the agent software 2 automatically backs up all files in the one or more backup folders 132 selected. The backup folder 132 is a folder under the operation system 131 and is stored in the storing unit 13.

The transmission unit 14 may be, for example but not limited to, a wired transmission module (such as a connector, a transmission cable, a network cable, or the combination thereof) or a wireless transmission module (such as a Bluetooth module, a Wi-Fi module, or an Infrared module, etc.). In one embodiment, the simulation device 1 connects to the Internet or LAN through the transmission unit 14, so as to connect with the backup management server 3. In one embodiment, the agent software 2 stores the backup file to the backup management server 3. In another embodiment, the agent software 2 stores the backup file to an external storage (such as removable drive, NAS, or tape library, etc.).

In another embodiment, the simulation device 1 directly connects to a backup destination 4 (such as cloud storage spaces including AWS S3, Azure Storage, or GCP Storage, etc.) through the Internet. In this embodiment, the simulation device 1 stores the backup file to the backup destination 4 through the transmission unit 14. The backup destination 4 is a server different from the backup management server 3, and the backup destination 4 only stores the backup file without intervening the execution of the backup plan as well as the simulation process.

The simulation device 1 of the present disclosure may execute the agent software 2 to configure the backup plan, and then the agent software 2 may back up specific data for the simulation device 1 in accordance with the backup plan. In addition to backing up internal data, the simulation device 1 further executes the agent software 2 to simulate ransomware attacks, so as to train the user 10 to perform a restoring process for backup.

In particular, after being executed, the agent software 2 automatically generates a first file in the simulation device 1 without affecting the user 10's operation of the simulation device 1 (for example, generating the first file when the simulation device 1 is under a standby mode or executing daily tasks), and then stores the first file to a backup folder associated with the backup plan. In one embodiment, the backup plan has been configured with a location (e.g., the backup folder) of an attack target of the simulation process. If the backup plan specifies a backup folder, the agent software 2 will automatically back up all files in the backup folder whenever a designated time point indicated by the backup plan is reached. In one embodiment, "back up" means to generate a duplicate of the files in the backup folder and upload the duplicate to the backup destination 4. In another embodiment, "back up" means to generate a duplicate of the files in the backup folder and upload the duplicate to the backup management server 3.

In the present disclosure, the first file is an unimportant file to the simulation device 1, and no effect will happen to the simulation device 1 even if the first file is moved, deleted, or corrupted. Therefore, the agent software 2 can corrupt the content of the first file to simulate a ransomware attack without affecting the user 10's operation or the data security of the simulation device 1.

As mentioned above, when a scheduled time indicated by the backup plan is reached (such as 3:00 p.m. or every 30 minutes, etc.), the agent software 2 backs up the first file in the backup folder to generate a first backup file. For instance, the agent software 2 generates a duplicate of the first file to upload to the backup destination 4. In this embodiment, the duplicate stored in the backup destination 4 is the aforementioned first backup file, where the content of the first backup file is identical to the content of the first file in the backup folder.

Next, to simulate that a ransomware attacks the simulation device 1 and corrupts the content of the first file, the agent software 2 corrupts the content of the first file to generate a second file. In one embodiment, the second file is stored in the same backup folder to replace the first file. In the present disclosure, the agent software 2 corrupts the first file to generate the second file, so as to regard the corrupted content of the second file as a result of a ransomware attack.

When the scheduled time specified by the backup plan is reached again, the agent software 2 backs up the second file in the backup folder to generate a second backup file. For instance, the agent software 2 uploads the duplicate of the second file to the backup destination 4 or the backup management server 3. In this embodiment, the duplicate of the second file stored in the backup destination 4 or the backup management server 3 is the aforementioned second backup file.

In one embodiment, the agent software 2 is capable of detecting ransomware attacks. In another embodiment, the backup management server 3 is capable of detecting ransomware attacks. When the simulation device 1 uploads the corrupted file, the agent software 2 or the backup management server 3 may analyze the content of the corrupted file, determine that this file has suffered from a ransomware attack, and then send an alert message to the simulation device 1. The present disclosure utilizes the agent software 2 to simulate the aforementioned characteristics of such a backup system. After generating the second backup file, the agent software 2 sends an alert message to the simulation device 1 based on the corrupted content of the second file. The alert message can be displayed on the simulation device 1 to notify the user 10 about the event of the ransomware attack.

As mentioned above, the agent software 2 is a backup tool of the simulation device 1, and as a result, the agent software 2 can provide a restoring measure to the user 10 when the simulation device 1 is under attack (i.e., a simulated ransomware attack). In one embodiment, the restoring measure includes providing a backup restoring interface on a display screen of the simulation device 1. After the simulation device 1 sends the alert message and the agent software 2 provides the restoring measure, the user 10 may initiate the restoring measure on the simulation device 1 to restore an uncorrupted content from the first file/first backup file.

As mentioned above, one purpose of the present disclosure is to evaluate the user 10's response capabilities during the ransomware attacks. Therefore, in one embodiment, the agent software 2 can reward the user 10 with a corresponding score if the user's operation satisfies a certain condition (for example, performs the restoring process within a time period after receiving the alert message). Therefore, after the backup plan has been executed for a while (such as one quarter), the company manager can evaluate each user's response capabilities during ransomware attacks, as well as each user 10's familiarity with the restoring process, based on the accumulated scores of each user 10.

Figure 3:
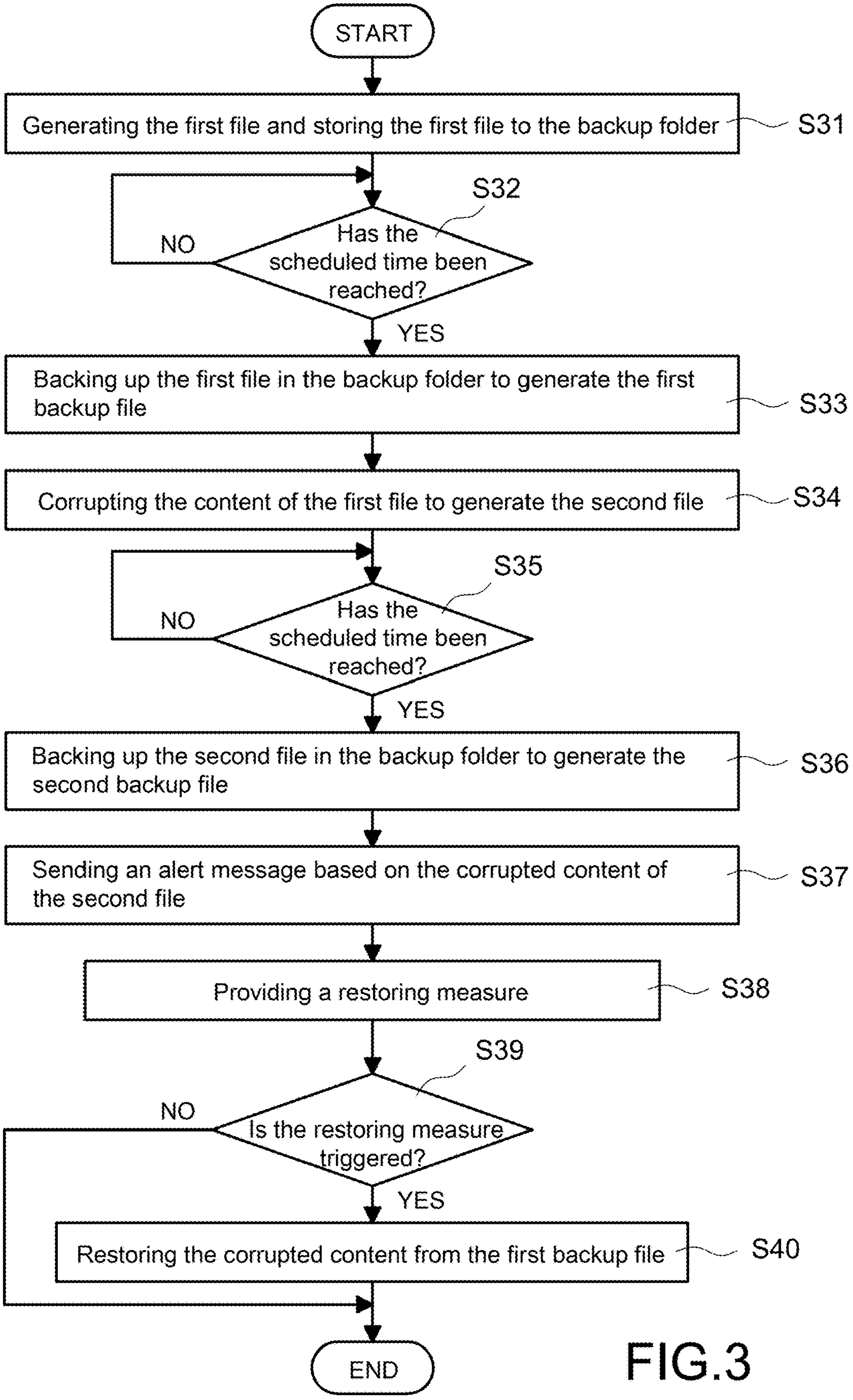
FIG. 3 is a flowchart of the simulation method of an embodiment according to the present disclosure.

Please refer to FIG. 2 and FIG. 3 at the same time, where FIG. 3 is a flowchart of the simulation method according to an embodiment of the present disclosure. FIG. 3 discloses specific simulation steps of the simulation method of the present disclosure, and the simulation method is applied to the simulation device 1 as shown in FIG. 2.

After the user 10 installs the agent software 2 on the simulation device 1 and configures the backup plan, the agent software 2 automatically generates the first file based on the backup plan, and stores the first file to the backup folder that is associated with the backup plan (step S31). In one embodiment, the agent software 2 automatically generates the first file immediately after being executed. In another embodiment, the agent software 2 automatically generates the first file when a default condition is satisfied (for example, after running for a preset period of time). In another embodiment, the agent software 2 automatically generates the first file after receiving an instruction from the backup management server 3. However, the above description only includes a few embodiments of the present disclosure, and is not limited thereto.

As mentioned above, the first file generated by the agent software 2 is utilized to simulate a ransomware attack on the simulation device 1 and guide the user 10 to perform the restoring process. The content of the first file is irrelevant to the user 10 and the running process of the simulation device 1, therefore, any movement, deletion, and modification made to the first file only changes the space of the storing unit 13, but does not cause any impact to the user 10 or the simulation device 1. In the present disclosure, the backup plan configured by the user 10 may record at least one scheduled time. After generating the first file, the agent software 2 continuously determines whether the scheduled time indicated by the backup plan is reached (step S32). In one embodiment, the scheduled time is a period of time, such as every 30 minutes or every 1 hour, etc. In another embodiment, the scheduled time is a specific time point, such as 10:00 a.m. or 3:00 p.m.

When determining that the scheduled time has not yet been reached at the step S32, the agent software 2 keeps waiting. If the backup plan records another backup schedule, the agent software 2 continues backing up data of the simulation device 1 during the waiting period. When determining that the scheduled time has been reached at the step S32, the agent software 2 backs up the first file in the backup folder indicated by the backup plan to generate the first backup file (step S33).

After the step S33, a snapshot of at least one backup folder has been taken. After taking the at least one snapshot (the snapshot includes the first backup file), the agent software 2 may corrupt the content of the first file to generate the second file (step S34). In the present disclosure, it does not matter how the agent software 2 corrupts the content of the first file as the agent software 2 recognizes the second file as a result of a ransomware attack on the simulation device 1 based on its corrupted content.

In one embodiment, the agent software 2 applies an encryption algorithm, a hashing algorithm, a word substitution, or a content erasure to the content of the first file at the step S34 to generate the second file with the corrupted content. In one embodiment, the encryption algorithm may be an advanced encryption standard (AES) algorithm, a triple data encryption standard (3DES) algorithm, or a data encryption standard (DES) algorithm, etc. The hashing algorithm may be a secure hash algorithm 256-bit (SHA-256), a hash-based message authentication code (HMAC) algorithm, or a message digest algorithm 5, (MD5), etc. The word substitution may involve replacing part or all of the words in the first file with specific or random characters so that the content of the second file differs from the content of the first file. Content erasure may involve deleting part of the content of the first file, causing the content of the second file to differ from the content of the first file.

After step S34, the agent software 2 continuously determines whether the scheduled time indicated by the backup plan has been reached (step S35). When the scheduled time is reached again, the agent software 2 backs up the second file in the backup folder to generate a second backup file (step S36).

In the present disclosure, the agent software 2 can simulate a detection software that is utilized for traditional backup system to detect whether files are under attack. To be more specifically, the second file with the corrupted content is generated by the agent software 2, so the agent software 2 can directly regard the second file as a corrupted file being attacked right after generating the second file without detecting the content of the second file. Therefore, after the step S36, the agent software 2 directly sends an alert message to the user 10 based on the corrupted content of the second file (step S37). In one embodiment, the alert message indicates that the content of the second file is suspected to be subject to a ransomware attack and asks the user 10 to perform the restoring process. In one embodiment, the agent software 2 is a software directly installed on the simulation device 1. As a result, in the step S37, the agent software 2 can directly provide a pop-up window on the simulation device 1 and display the alert message in the pop-up window, so as to immediately notify the user 10 of the simulation device 1.

In the present disclosure, after the agent software 2 sends the alert message, it can further provide a restoring measure (step S38). In one embodiment, the restoring measure can be a restoring interface, which enables the user 10 to select a snapshot (e.g., a snapshot of the backup folder that includes the first backup file) to recover from it, so as to perform the restoring process. After providing the restoring measure, the agent software 2 continues to determine whether the restoring measure is triggered (step S39), i.e., whether the user 10 performs the restoring process with respect to this alert message. When the restoring measure is triggered (i.e., the user 10 does perform the restoring process), the agent software 2 restores the corrupted content from the first backup file (step S40). It should be mentioned that, in the embodiment of FIG. 3, the agent software 2 only generates two duplicates from the first file (i.e., the first backup file and the second backup file) where the content of the second backup file has been corrupted, therefore, the user 10 can only select the first backup file to perform the restoring process. In another embodiment, however, the agent software 2 may generate multiple duplicates from the first file at different scheduled times. Therefore, it is unnecessary for the agent software 2 to restore the corrupted content only from the first backup file at the step S40.

As mentioned above, one purpose of the present disclosure is to evaluate the user 10's response capabilities during ransomware attacks and confirm whether the user 10's familiarity with the restoring process. According to this purpose, if the agent software 2 consistently fails to detect the restoring measure being triggered at the step S39, the agent software 2 may evaluate that the user 10's response capabilities is inadequate (e.g., by not rewarding a score to the user 10). On the other hand, if the agent software 2 detects, at the step S39, that the restoring measure is triggered, in addition to restoring the content from the first backup file, the agent software 2 also rewards the user 10 with a corresponding score (as detailed below).

In the aforementioned embodiments, the agent software 2 directly sends the alert message to notify the user 10 at the step S37. In another embodiment, however, the agent software 2 may send the alert message through other means.

Figure 4:
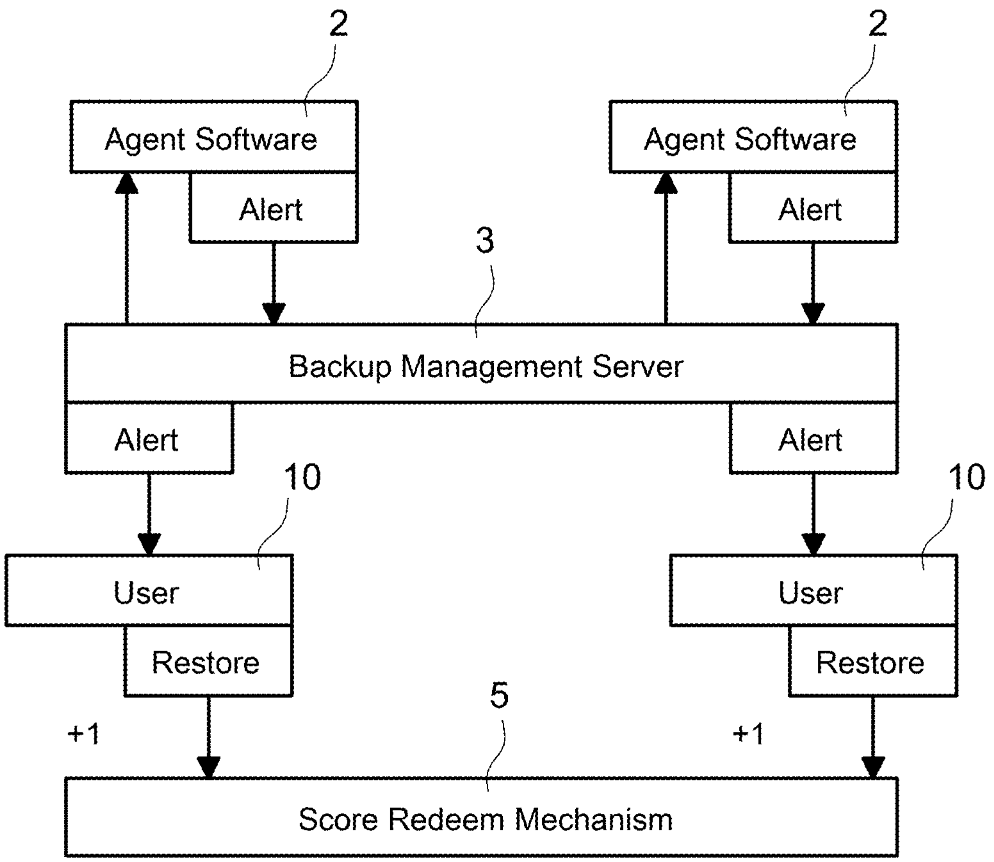
FIG. 4 is a schematic diagram showing the simulation framework of an embodiment according to the present disclosure.

Please refer to FIG. 4, which is a schematic diagram showing the simulation framework of an embodiment according to the present disclosure. In one embodiment, every simulation device 1 is associated with one e-mail address. More specifically, one user 10 uses one simulation device 1 unchanged, and the user 10 enters their e-mail address on this simulation device 1. In this embodiment, the agent software 2 may obtain the e-mail address associated with the simulation device 1 at the step S37, and send the alert message to this e-mail address through sending an e-mail, so as to notify the user 10 of the simulation device 1. In one embodiment, the agent software 2 confirms that the user 10 has received the notification after determining that this e-mail has been checked by the user 10, and then provides the aforementioned restoring measure. In another embodiment, the agent software 2 allows the user 10 to trigger the restoring measure at any time point.

In another embodiment, the simulation device 1 connects with the backup management server 3 through the agent software 2. The function of the backup management server 3 is to assist the user 10 to record and manage the backup plan. In one embodiment, the backup management server 3 may record the e-mail address(es) associated with each simulation device 1 that participates the backup plan. More specifically, the backup management server 3 may record information of the user 10 of each simulation device 1, where the information includes the e-mail address of the user 10. In the embodiment, the agent software 2 of a simulation device 1 may notify the backup management server 3 based on the corrupted content of the second file at the step S37. After receiving the notification, the backup management server 3 inquires an e-mail address corresponding to the simulation device 1 being notified, and then sends the alert message to this e-mail address, so as to warn the user 10 of this simulation device 1. In another embodiment, the agent software 2 may directly send the alert message to the e-mail address of the user 10.

As mentioned above, after the user 10 receives the alert message, the agent software 2 further provides the restoring measure. After the user 10 triggers the restoring measure, the agent software 2 retrieves the first backup file and recovers the content of the first file. In addition, as a simulation software, the agent software 2 continuously detects whether the user 10 correctly performs the restoring process. Also, the agent software 2 executes a score redeem mechanism 5 when the user 10 correctly performs the restoring process, so that the user 10 may obtain a corresponding score. In one embodiment, the agent software 2 communicates with the backup management server 3 when the user 10 correctly performs the restoring process, and then the backup management server 3 redeems a corresponding score for the user 10. However, the above description only includes few embodiments of the present disclosure, but not limited thereto.

In the present disclosure, the company manager can, after a period of the backup plan execution (e.g., one month, one quarter, or half a year, etc.), compile the accumulated scores of all users 10 participating in the backup plan. This allows the company manager to evaluate each user 10's response capabilities during ransomware attacks and their familiarity with the restoring process.

Figure 5:
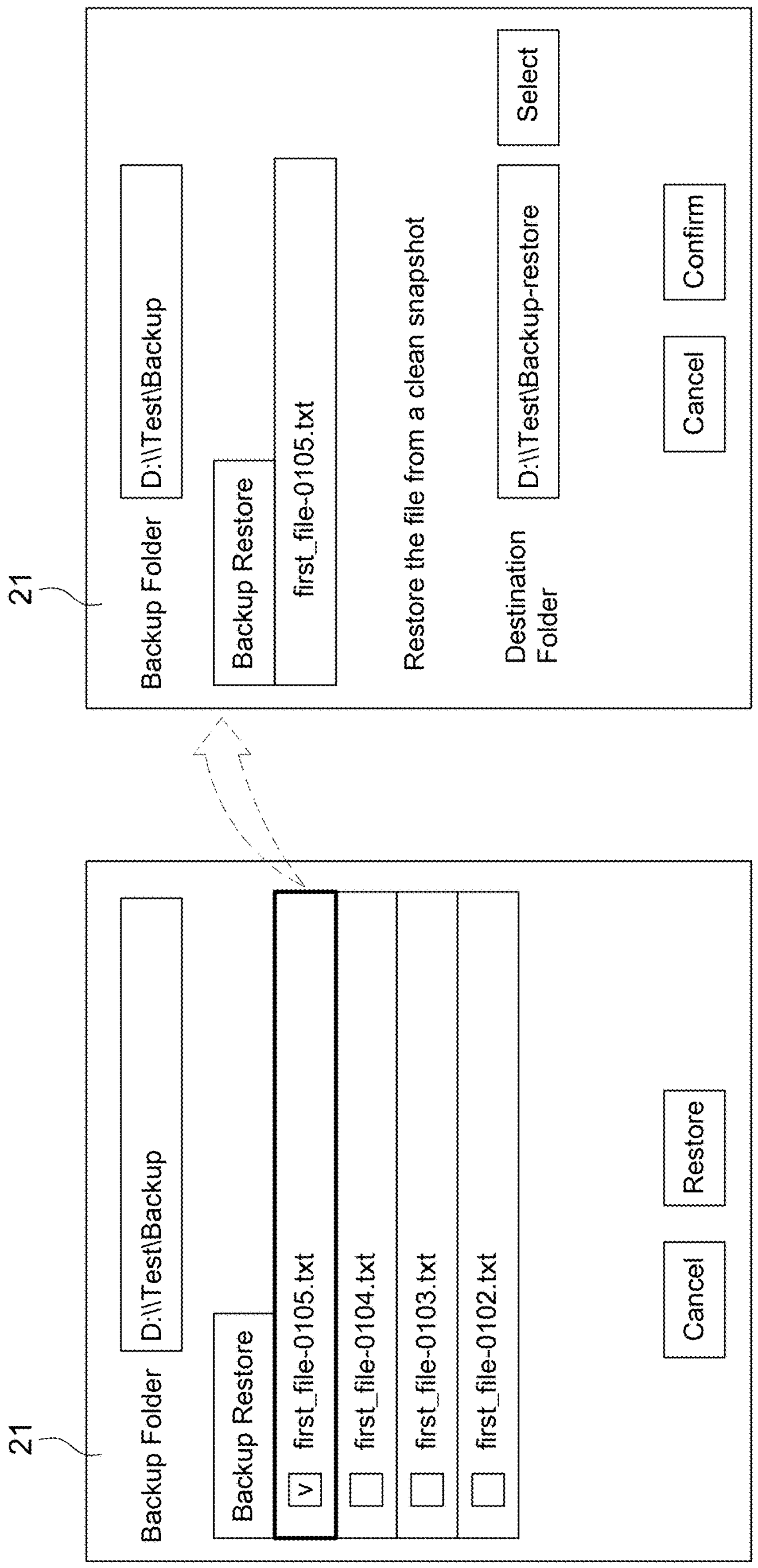
FIG. 5 is a schematic diagram showing a restore interface of an embodiment according to the present disclosure.

Please refer to FIG. 5, which is a schematic diagram showing a restore interface of an embodiment according to the present disclosure. In the embodiment of FIG. 5, the restoring measure is a restoring interface 21 displayed on a display screen of the simulation device 1. As shown in FIG. 5, the agent software 2 may display the currently available restoring targets (such as "first_file-0102.txt", "first_file-0103.txt", "first_file-0104.txt", or "first_file-0105.txt", etc.) on the restoring interface 21. In the embodiment, these available restoring targets are duplicates (such as the first backup file) generated by the agent software 2 for the file (such as the first file) in the backup folder at different scheduled times. In one embodiment, the agent software 2 only shows uncorrupted backup file(s) on the restoring interface 21.

After triggering the restoring measure, the user 10 may select any of the backup files displayed on the restoring interface 21. After the user 10 presses a restore button of the restoring interface 21, the agent software 2 restores the content of the file suspected of being corrupted to the content of the backup file selected by the user 10 and then stores the restored file to a default destination folder.

As mentioned above, after the user 10 triggers the restoring measure and successfully completes the restoring process, the agent software 2 restores the uncorrupted file back to the simulation device 1 or another computer, and evaluates the user 10's response capabilities through the score redeem mechanism 5.

Figure 6:
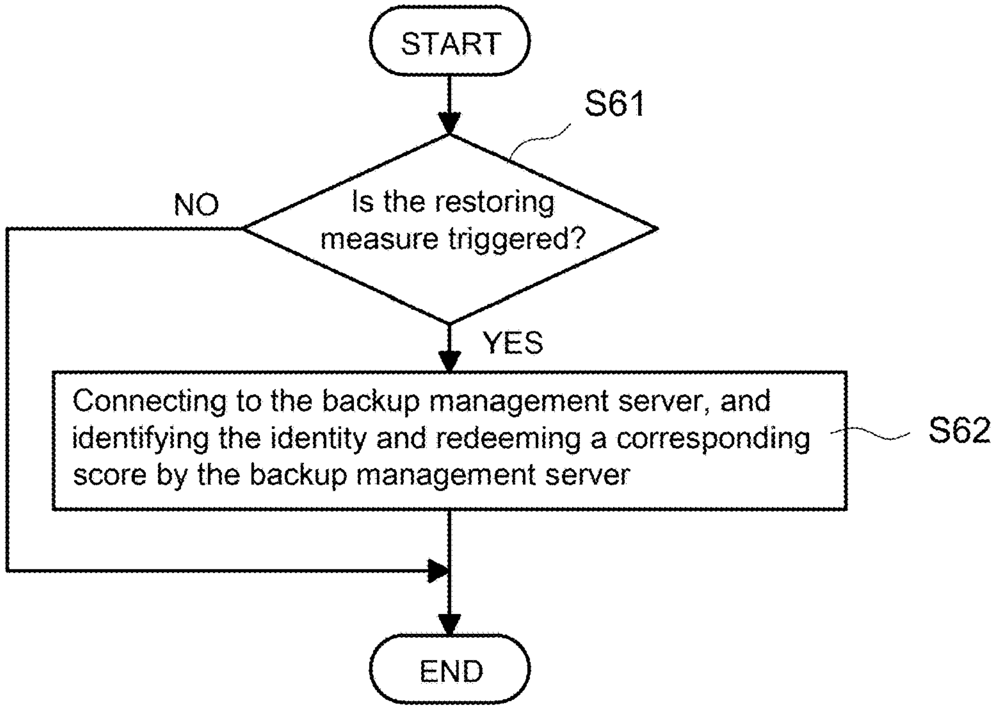
FIG. 6 is a flowchart for score redeem process of an embodiment according to the present disclosure.

Please refer to FIG. 6, where FIG. 6 is a flowchart for the score redeem process of an embodiment according to the present disclosure. In the embodiment, the restoring measure is provided by the agent software 2 (such as the restoring interface 21 shown in FIG. 5), so the agent software 2 may directly detect whether the user 10 triggers the restoring measure on the simulation device 1 (step S61). If the user 10 does not trigger the restoring measure (e.g., closes the restoring interface 21 or ignores the restoring interface 21 for a default period of time), the agent software 2 will not provide any score to the user 10. If the agent software 2 detects that the user 10 triggers the restoring measure and restores the content of the first backup file, the agent software 2 connects to the backup management server 3 according to the ID of the simulation device 1 or the identity of the user 10, and the backup management server 3 identifies the identity of the simulation device 1 and then redeems a corresponding score for the user 10 associated with this simulation device 1 (step S62). For example, if the user 10 correctly triggers the restoring measure, the backup management server 3 redeems one score for the user 10. For another example, if ten ransomware attacks are simulated in the backup plan and the user 10 correctly triggers the restoring measure for ten times, the backup management server 3 cumulatively redeems ten scores for the user 10. If the user 10 only correctly triggers the restoring measure five times within the ten simulated ransomware attacks, the backup management server 3 will only redeem five scores for the user 10.

Figure 7:
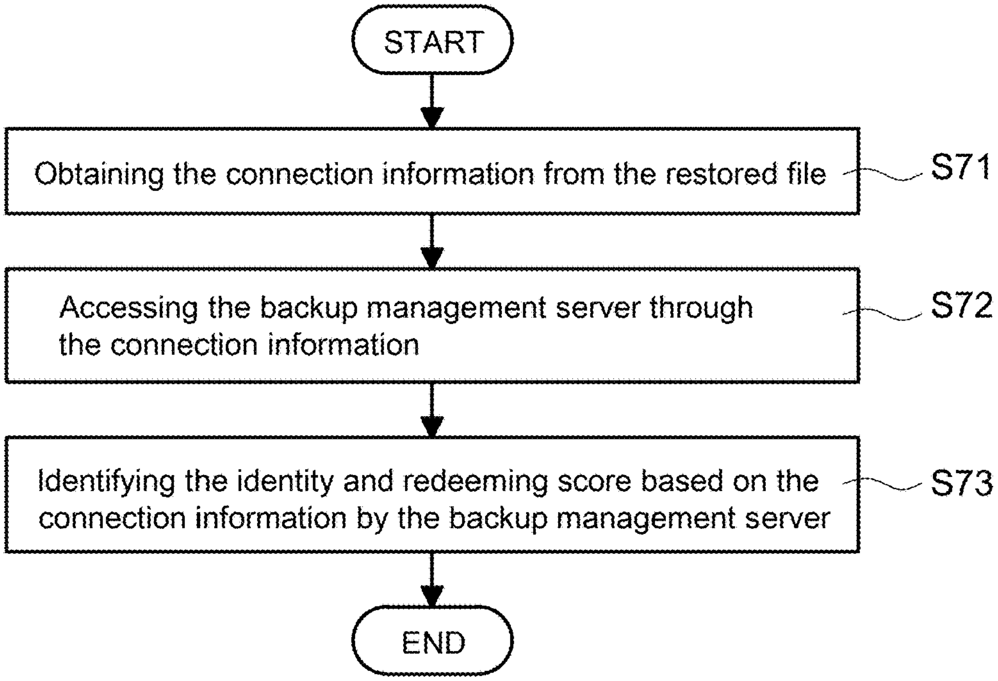
FIG. 7 is a flowchart for score redeem process of another embodiment according to the present disclosure.

Please refer to FIG. 7, which is a flowchart for the score redeem process of another embodiment according to the present disclosure. As mentioned above, the first file generated by the agent software 2 is a file that does not affect the simulation device 1 and the user 10, so the content of the first file can be randomly generated by the agent software 2. In one embodiment, the content of the first file contains a unique ID that can be used to identify the simulation device 1 and/or the user 10, a random string, or connection information that enables the simulation device 1 to connect to and access the backup management server 3, such as a uniform resource locator (URL), a universal naming convention (UNC) path, or an application programming interface (API), among others.

In the embodiment of FIG. 7, after the user 10 triggers the restoring measure, the agent software 2 restores the content from the uncorrupted file (such as the first backup file). Meanwhile, the user 10 can open the restored file on the simulation device 1 and obtain the connection information from the content of the restored file (step S71). Next, the user 10 uses the connection information (for example, by inputting the URL into the browser of the simulation device 1), so the simulation device 1 accesses the backup management server 3 through the connection information (step S72). It should be mentioned that the connection information can carry a specific identification ID or point to a specific address of the backup management server 3. Therefore, when the backup management server 3 allows the simulation device 1 to log in, it may identify the identity of the simulation device 1 and the user 10 and then redeem a corresponding score for the user 10 of the simulation device based on the connection information used by the simulation device 1 (step S73).

As mentioned above, if the user 10 triggers the restoring measure to successfully complete the restoring process after receiving the alert message of a ransomware attack, the user 10 can obtain a corresponding score. Therefore, the company manager can evaluate the user 10's response capabilities during the ransomware attack based on the user 10's scores accumulated in a certain period of time.

As mentioned above, before the agent software 2 executes the simulation process, it must establish a backup plan for the simulation device 1. In one embodiment, in addition to identifying the identity of the simulation device 1 and the user 10, the backup management server 3 can further assist the user 10 with establishing the backup plan.

More specifically, the company manager may configure the backup management server 3 to determine a member list that records members who should participate the simulation process. Next, the backup management server 3 generates an activation message corresponding to the member list and respectively sends the activation message to each corresponding simulation device 1. For example, the company manager configures that a member A, a member B, a member C, and a member D from a first department should participate the simulation process. The backup management server 3 may generate four activation messages and send them to a computer A used by the member A, a computer B used by the member B, a computer C used by the member C, and a computer D used by the member D. In the embodiment, each of the activation messages includes a control command indicating the agent software 2 to activate the backup process and the unique ID and the unique connection information for identifying the identity of the member and/or the simulation device 1.

In the embodiment, after the agent software 2 is executed in the simulation device 1, the agent software 2 will first wait. After the company manager completes the configuration as mentioned above, the agent software 2 can receive the aforementioned activation message from the backup management server 3 (step S81). After receiving the activation message, the agent software 2 may assist the user 10 to start establishing the backup plan based on the content of the activation message (step S82). In one embodiment, establishing the backup plan at least includes setting one or more scheduled times for the backup activity (e.g., as shown in FIG. 3, the first scheduled time for backing up the first file and the second scheduled time for backing up the second file) and setting the backup folder for regular backup.

Figure 8:
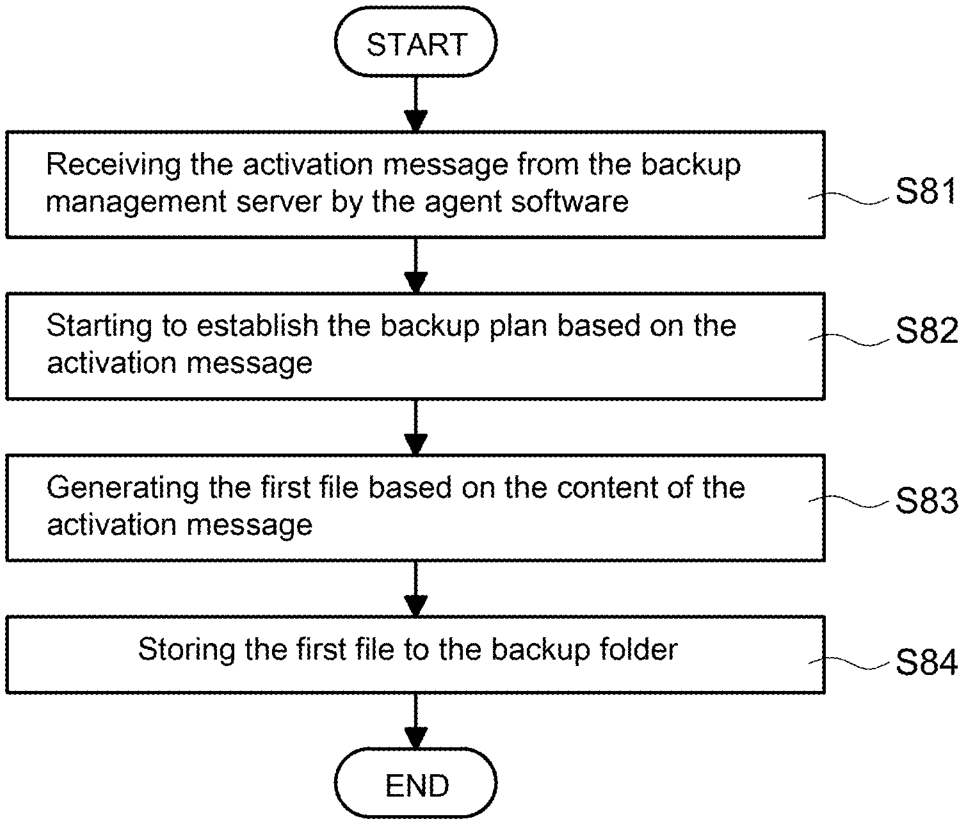
FIG. 8 is a flowchart for creating the backup plan of an embodiment according to the present disclosure.

As mentioned above, the activation message at least includes an identification string (such as the unique ID and the unique connection information) that is associated with the simulation device 1 and can be utilized to identify the simulation device 1 that receives this activation message. In the embodiment, the agent software 2 generates the content of the first file based on the identification string included in the activation message (step S83). For example, the content of the first file can directly include the unique connection information, but not limited thereto. After the first file is automatically generated, the agent software 2 stores the first file to the backup folder indicated by the backup plan (step S84). The step S83 to the step S84 as disclosed in FIG. 8 are similar to the step S31 as shown in FIG. 3, which utilizes the agent software 2 to automatically generate the first file (based on the content of the activation message) and store the first file to the backup folder associated with the backup plan. Therefore, when the scheduled time indicated by the backup plan is reached, the agent software 2 automatically backs up the first file from the backup folder to activate the entire simulation process.

Figure 9:
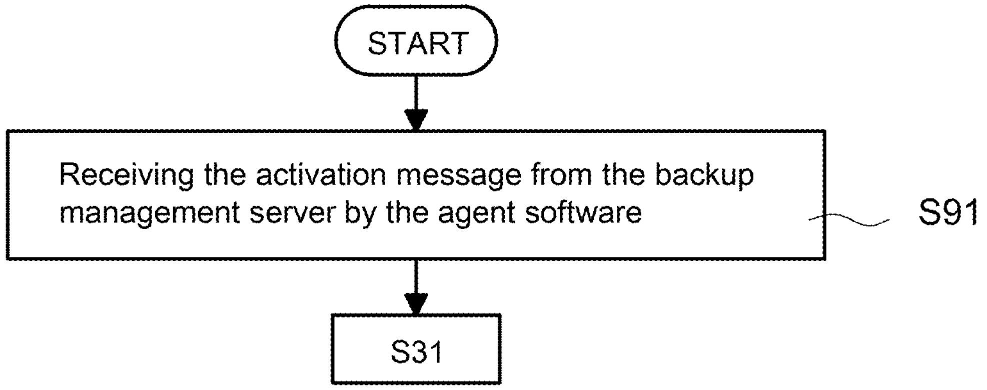
FIG. 9 is a flowchart for triggering the simulation method of an embodiment according to the present disclosure.

Please refer to FIG. 9, which is a flowchart for triggering the simulation method of an embodiment according to the present disclosure. As shown in FIG. 9, the agent software 2 receives the activation message from the backup management server 3 (step S91). In the embodiment of FIG. 9, the agent software 2 does not establish a new backup plan after receiving the activation message, but triggers an existing backup plan, to further execute each action as shown in the embodiment of FIG. 3 (i.e., the step S31 to the step S40).

In the present disclosure, a specific member (such as the company manager) can configure the one or more users who need to participate the simulation process. Under this condition, the backup management server 3 can record the identities of these users as well as the simulation devices 1 respectively used by each of the users. In one embodiment, the multiple simulation devices 1 participating in the same simulation process can constitute a simulation device group.

For example, the specific member can configure that all members in the same department need to participate the same simulation process. Under this condition, the simulation device group includes all the simulation devices 1 owned and used by this department. When these simulation devices 1 execute the simulation method as shown in FIG. 3 to simulate ransomware attacks and guide the users 10 to perform the restoring process, and redeem corresponding scores for the users 10, the backup management server 3 can calculate the scores of each simulation device 1 (i.e., each user 10) as well as the total scores of the simulation device group. In one embodiment, the backup management server 3 provides a display interface (such as a web-based interface). The specific member can log in to the backup management server 3, and the specific member can check the total scores of the simulation device group on the display interface as well as the individual score of each user 10 of each simulation device 1 in the simulation device group.

In another embodiment, the aforementioned display interface can be a dashboard. After logging in to the backup management server 3, the specific member can quickly check the accumulated scores of each user/department through the dashboard, so as to evaluate the response capabilities as well as the familiarity with the restoring process of each user/department in the event of ransomware attacks.

What is claimed is:

1. A backup-based ransomware attack simulation method, applied to a simulation device, the simulation device comprising an agent software utilized for backup, and the simulation method comprising:

automatically generating a first file and storing the first file to a backup folder associated with a backup plan by the agent software;

backing up the first file in the backup folder to generate a first backup file by the agent software when a first scheduled time indicated by the backup plan is reached;

corrupting the content of the first file to generate a second file by the agent software, wherein the second file is regarded as a result of a ransomware attack due to a corrupted content of the second file;

backing up the second file in the backup folder to generate a second backup file by the agent software when a second scheduled time indicated by the backup plan is reached;

sending an alert message by the agent software based on the corrupted content of the second file; and providing a restoring measure by the agent software, and restoring the content of the first backup file by the agent software when the restoring measure is triggered.

2. The simulation method in claim 1, further comprising:

receiving an activation message from a backup management server by the agent software and triggering each action comprised in the simulation method of claim 1 in response to receiving the activation message.

3. The simulation method in claim 2, wherein the activation message comprises an identification string for identifying the simulation device that receives the activation message;

wherein in the step of automatically generating the first file by the agent software, the agent software generates the content of the first file based on the identification string.

4. The simulation method in claim 1, wherein in the step of corrupting the content of the first file by the agent software to generate the second file, the agent software corrupts the content of the first file through an advanced encryption standard (AES) algorithm, a triple data encryption standard (3DES) algorithm, a data encryption standard (DES) algorithm, a secure hash algorithm 256-bit (SHA-256), a hash-based message authentication code (HMAC) algorithm, a message digest algorithm 5, (MD5), a word substitution corruption method, or a content erasure corruption method.

5. The simulation method in claim 1, wherein the simulation device is associated with an e-mail address, and in the step of sending the alert message by the agent software based on the corrupted content of the second file, the agent software sends the alert message to the e-mail address to notify a user of the simulation device.

6. The simulation method in claim 1, wherein the simulation device is associated with an e-mail address, and in the step of sending the alert message by the agent software based on the corrupted content of the second file, the agent software notifies a backup management server based on the corrupted content of the second file for the backup management server to send the alert message to the e-mail address in order to alarm a user of the simulation device.

7. The simulation method in claim 1, further comprising:

connecting the simulation device to a backup management server through the agent software after the restoring measure is triggered; and identifying the simulation device and redeeming a corresponding score for a user of the simulation device by the backup management server.

8. The simulation method in claim 1, further comprising:

restoring the content from the first backup file after the restoring measure is triggered, wherein the content at least comprises connection information of a backup management server, and the connection information comprises uniform resource locator (URL), universal naming convention (UNC) path, or application API;

accessing the backup management server through the connection information; and identifying the simulation device and redeeming a corresponding score for a user of the simulation device by the backup management server based on the connection information.

9. The simulation method in claim 8, wherein the backup management server calculates a total score of a simulation device group, wherein the simulation device group comprises multiple simulation devices used by multiple users, wherein the backup management server provides a display interface for displaying an individual score of the user of each of the simulation devices or the total score of the simulation device group.

10. The simulation method in claim 1, further comprising:

receiving an activation message by the agent software from a backup management server;

establishing the backup plan by the agent software based on the activation message, wherein establishing the backup plan comprises setting the first schedule time and the second scheduled time and setting the backup folder;

wherein, in the step of automatically generating the first file by the agent software, the agent software generates the first file based on the content of the activation message, wherein the activation message at least comprises an identification string used to identify the simulation device that receives the activation message.

11. A backup-based ransomware attack simulation device, comprising one or more processors, the one or more processor configured to execute an agent software that records a plurality of computer executable instructions to execute following actions:

automatically generating a first file and storing the first file to a backup folder associated with a backup plan;

backing up the first file in the backup folder to generate a first backup file when a first scheduled time indicated by the backup plan is reached;

corrupting the content of the first file to generate a second file, wherein the second file is regarded as a result of a ransomware attack due to a corrupted content of the second file;

backing up the second file in the backup folder to generate a second backup file when a second scheduled time indicated by the backup plan is reached;

sending an alert message based on the corrupted content of the second file; and providing a restoring measure, and restoring the content of the first backup file when the restoring measure is triggered.

12. The simulation device in claim 11, wherein the one or more processors are configured to execute the agent software to further:

receive an activation message from a backup management server and trigger each action executed by the agent software of the simulation device in claim 11 in response to receiving the activation message.

13. The simulation device in claim 12, wherein the activation message comprises an identification string for identifying the simulation device that receives the activation message;

wherein in the action of automatically generating the first file, the one or more processors are configured to generate the content of the first file based on the identification string.

14. The simulation device in claim 11, wherein in the action of corrupting the content of the first file to generate the second file, the one or more processors are configured to corrupt the content of the first file through an advanced encryption standard (AES) algorithm, a triple data encryption standard (3DES) algorithm, a data encryption standard (DES) algorithm, a secure hash algorithm 256-bit (SHA-256), a hash-based message authentication code (HMAC) algorithm, a message digest algorithm 5, (MD5), a word substitution corruption method, or a content erasure corruption method.

15. The simulation device in claim 11, wherein the simulation device is associated with an e-mail address, and in the action of sending the alert message based on the corrupted content of the second file, the one or more processors are configured to send the alert message to the e-mail address to notify a user of the simulation device.

16. The simulation device in claim 11, wherein the simulation device is associated with an e-mail address, and in the action of sending the alert message based on the corrupted content of the second file, the one or more processors are configured to notify a backup management server based on the corrupted content of the second file for the backup management server to send the alert message to the e-mail address in order to alarm a user of the simulation device.

17. The simulation device in claim 11, wherein the one or more processors are configured to execute the agent software to further:

connect to a backup management server through the agent software after the restoring measure is triggered; and identify the simulation device and redeem a corresponding score for a user of the simulation device by the backup management server.

18. The simulation device in claim 11, wherein the one or more processors are configured to execute the agent software to further:

restore the content from the first backup file after the restoring measure is triggered, wherein the content at least comprises connection information of a backup management server, and the connection information comprises uniform resource locator (URL), universal naming convention (UNC) path, or application API;

access the backup management server through the connection information; and identify the simulation device and redeem a corresponding score for a user of the simulation device by the backup management server based on the connection information.

19. The simulation device in claim 18, wherein the backup management server is configured to calculate a total score of a simulation device group, wherein the simulation device group comprises multiple simulation devices used by multiple users, wherein the backup management server is configured to further provide a display interface, the display interface is configured to display an individual score of the user of each of the simulation devices or the total score of the simulation device group.

20. The simulation device in claim 11, wherein the one or more processors are configured to execute the agent software to further:

receive an activation message from a backup management server;

establish the backup plan based on the activation message, wherein establishing the backup plan comprises setting the first schedule time and the second scheduled time and setting the backup folder;

wherein, in the action of automatically generating the first file, the agent software generates the first file based on the content of the activation message, wherein the activation message at least comprises an identification string used to identify the simulation device that receives the activation message.

* * * * *